(12) United States Patent
Tchepikov et al.

(10) Patent No.: US 11,548,472 B2
(45) Date of Patent: Jan. 10, 2023

(54) SEAT BELT ASSEMBLY

(71) Applicant: Ford Global Technologies, LLC, Dearborn, MI (US)

(72) Inventors: Igor Tchepikov, Point Cook (AU); Nuttaphon Boonyarangkavorn, Hilldene (AU); Alan Dyer, Melbourne (AU); Christian Trentin, Niddrie (AU); Brett Carroll, Ringwood North (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/712,203

(22) Filed: Apr. 4, 2022

(65) Prior Publication Data

US 2022/0324413 A1 Oct. 13, 2022

(51) Int. Cl.
*B60R 22/26* (2006.01)
*B60R 22/18* (2006.01)

(52) U.S. Cl.
CPC ...... *B60R 22/26* (2013.01); *B60R 2022/1818* (2013.01); *B60R 2022/266* (2013.01)

(58) Field of Classification Search
CPC ............ B60R 22/26; B60R 2022/1818; B60R 2022/266; B60R 22/023; B60R 22/201; B60R 22/18; B60R 2022/1825; B60N 2/688; B60N 2205/35
USPC ...................................................... 280/801.1
See application file for complete search history.

(56) References Cited

U.S. PATENT DOCUMENTS

| | | | | |
|---|---|---|---|---|
| 4,218,074 A | * | 8/1980 | Crawford | B60N 2/366 280/801.1 |
| 5,647,611 A | | 7/1997 | Boyd et al. | |
| 5,829,831 A | * | 11/1998 | Sharman | B60R 22/34 297/483 |
| 5,921,605 A | * | 7/1999 | Musukula | B60N 2/5825 296/63 |
| 9,738,248 B2 | * | 8/2017 | Dingman | B60R 22/201 |

(Continued)

FOREIGN PATENT DOCUMENTS

| | | | | |
|---|---|---|---|---|
| DE | 102018110417 A1 | * | 11/2018 | B60N 2/012 |
| FR | 2741849 A1 | * | 6/1997 | B60R 22/18 |

(Continued)

OTHER PUBLICATIONS

Deniziot FR-2741849-A1 English Translation with Original Document retrieved Oct. 6, 2022 (Year: 1997).*

*Primary Examiner* — Paul N Dickson
*Assistant Examiner* — Caitlin Anne Miller
(74) *Attorney, Agent, or Firm* — Vichit Chea; Price Heneveld LLP

(57) ABSTRACT

A seat belt assembly unit includes a seat belt retractor, seat back, seat back frame, a rear wall interconnecting the side walls of a vehicle, a tubular member extending along the length of the rear wall and a belt guide disposed adjacent to the seat back and rigidly attached to the tubular member. The seat belt guide is a rod-shaped member formed substantially into a U-shape with its side portions inserted into holes on the tubular member. A shoulder belt extending from the retractor and passing through the seat belt guide, restrains occupants to the seat. The pulling force of the shoulder belt which restrains the occupant in the seat is transferred to the tubular member via the belt guide.

14 Claims, 4 Drawing Sheets

(56) References Cited

U.S. PATENT DOCUMENTS

| | | | | |
|---|---|---|---|---|
| 10,144,326 | B2 * | 12/2018 | Hayashi | ............ B60N 2/688 |
| 10,246,045 | B2 * | 4/2019 | Clyde | ............ B60N 2/012 |
| 2003/0160498 | A1 * | 8/2003 | Boelstler | ............ B60R 22/26 |
| | | | | 297/483 |

FOREIGN PATENT DOCUMENTS

| | | | | | |
|---|---|---|---|---|---|
| GB | 2298123 | A | | 8/1996 | |
| GB | 2314003 | A | * | 12/1997 | ............ B60R 22/26 |
| GB | 2314003 | A | | 12/1997 | |
| JP | 5066163 | B2 | * | 11/2012 | ............ B60N 2/688 |
| KR | 200146815 | Y1 | * | 6/1999 | ............ B60R 22/26 |

\* cited by examiner

SEAT BELT ASSEMBLY

CROSS-REFERENCE TO RELATED APPLICATION

This application claims foreign priority benefits under 35 U.S.C. § 119(a)-(d) to European Application No. 21167271.2 filed Apr. 7, 2021, which is hereby incorporated by reference in its entirety.

FIELD OF THE DISCLOSURE

The present disclosure generally relates to seat belts, and more particularly relates to a seat belt assembly for securing an occupant to a vehicle seat.

BACKGROUND OF THE DISCLOSURE

Seat belt restraint assemblies are commonly required for motor vehicles. During vehicle deceleration, the seat belts are designed to control the kinematic of occupant on a seat. When controlled by the seat belt, the occupant typically loads the seat belt. The seat belt in turn transfers the occupant loads to a vehicle structure supporting the seat belt assembly. The loads experienced by the seat belts may be transferred to the structural side walls and/or floor of the vehicle. It may be desirable to provide for further enhancements in seat belts for the occupants during a driving event.

SUMMARY OF THE DISCLOSURE

According to a first aspect of the present disclosure, a seat belt assembly for a vehicle having a floor, spaced side walls extending from the floor, and a seat supported by the floor is provided. The assembly includes a rear wall interconnecting the side walls, a seat belt retractor for attachment to a seat back frame, and an anchor attached to the vehicle body. The assembly also includes a seat belt guide disposed adjacent to an upper portion of the seat back frame for guiding a seat belt webbing extending from the seat belt retractor to the anchor, wherein the seat belt guide is rigidly fixed to a tubular member extending along the length of rear wall and the tubular member is rigidly attached to the side walls at its ends, wherein the tubular member has mounting holes configured to receive the two side portions of the seat belt guide, and wherein two side portions of the seat belt guide are inserted into the mounting holes in the tubular member with the side end portions facing downward and rigidly attached to the tubular member by at least one of a welding, brazing, adhesive bonding, riveting, soldering and compression fitting.

According to a second aspect of the present disclosure, a seat belt assembly for a vehicle having a floor, spaced side walls extending from the floor, and a seat supported by the floor is provided. The assembly includes a rear wall interconnecting the side walls, a seat belt retractor for attachment to a seat back frame, and an anchor attached to the vehicle body. The assembly also includes a seat belt guide disposed adjacent to an upper portion of the seat back frame for guiding a seat belt webbing extending from the seat belt retractor to the anchor, wherein the seat belt guide is rigidly fixed to a tubular member extending along the length of rear wall and the tubular member is rigidly attached to the side walls at its ends, wherein the tubular member has mounting holes configured to receive the two side portions of the seat belt guide, wherein two side portions of the seat belt guide are inserted into the mounting holes in the tubular member with the side end portions facing downward and rigidly attached to the tubular member by at least one of a welding, brazing, adhesive bonding, riveting, soldering and compression fitting. The assembly further includes a seat back frame, wherein the seat belt retractor is disposed in the seat back frame, and wherein the seat belt guide is a rod-shaped member formed substantially into a U-shape defined by two side portions and a transverse portion therebetween, wherein the transverse portion comprises the belt guide portion, and wherein the two side portions are rigidly fixed to the tubular member.

According to a third aspect of the present disclosure, a vehicle including a floor, spaced side walls extending from the floor, a seat supported by the floor, a rear wall interconnecting the side walls, a seat belt retractor for attachment to a seat back frame, and an anchor attached to the vehicle body is provided. The vehicle also includes a seat belt guide disposed adjacent to an upper portion of the seat back frame for guiding a seat belt webbing extending from the seat belt retractor to the anchor, wherein the seat belt guide is rigidly fixed to a tubular member extending along the length of rear wall and the tubular member is rigidly attached to the side walls at its ends, wherein the tubular member has mounting holes configured to receive the two side portions of the seat belt guide, and wherein two side portions of the seat belt guide are inserted into the mounting holes in the tubular member with the side end portions facing downward and rigidly attached to the tubular member by at least one of a welding, brazing, adhesive bonding, riveting, soldering and compression fitting.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
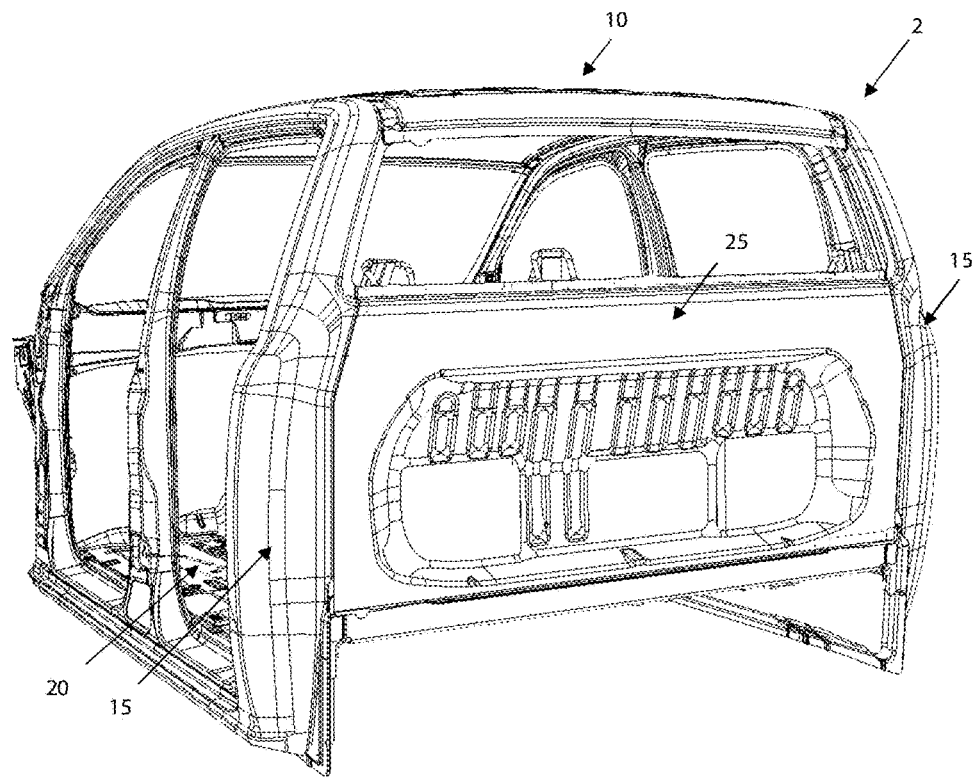
FIG. 1 is a rear perspective view of a vehicle cab showing the rear wall and the tubular member, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seat belt assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The disclosed seat belt mechanism will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Referring to FIG. 1, a vehicle assembly is illustrated showing a portion of the seat belt mechanism on a vehicle 2, according to one embodiment of the present disclosure. The vehicle assembly is illustrated as a pickup truck type vehicle 2 having an interior passenger cab 10. As appreciated, the subject disclosure as subsequently described is in no way limited to a particular type of vehicle 2. The cab 10 of the vehicle 2 includes spaced side walls 15 defining body sides. A floor 20 extends between the body sides and a rear wall 25 extends upwardly from the floor between the side walls 15. The cab 10 also includes a front dash, passenger doors, seat belt, windows and other known components to complete the enclosed pickup truck cab 10, some of which are not shown in the FIG. 1.

Figure 2:
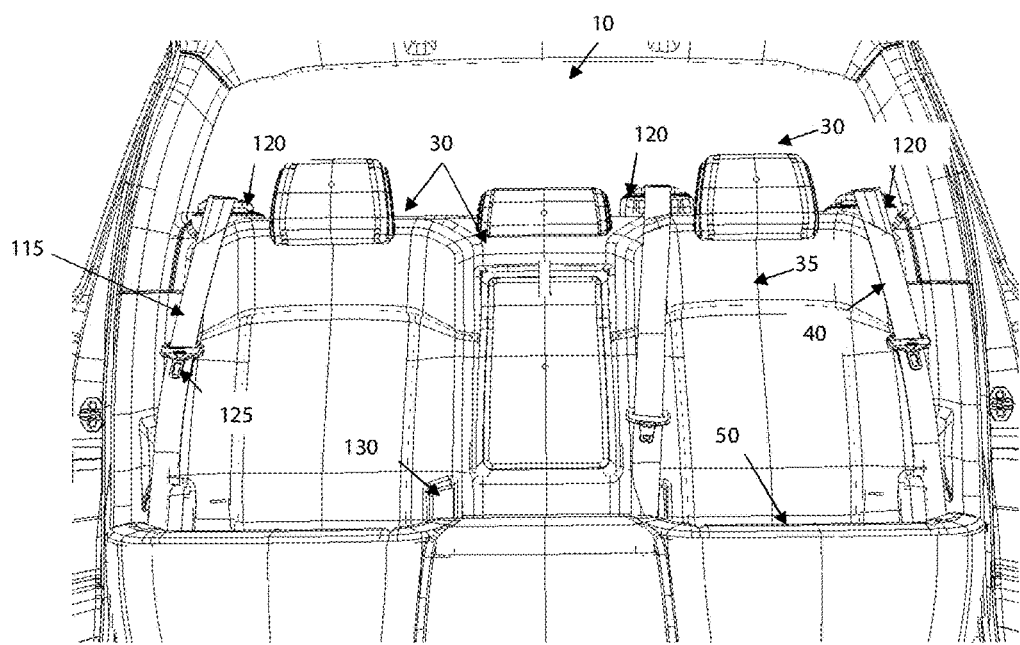
FIG. 2 is a front view of passenger seats on the vehicle showing the seat back, seat belt and belt guide.

FIG. 2 is a front view of the seats 30 showing the seat back 35, seat belt 40 and belt guide 120. The seats 30 are generally supported by the floor 20. Each seat 30 includes a seat back 35 and a seat cushion 50, as is well-known in the art. The seat 30 is illustrated as a bench type seat mounted to a rear of the cab 10. The seat 30 may be the primary seat for the vehicle 2 or may be a second-row seat such as typically provided in super cab pickup trucks. The seat back may be pivotal such that the seat back can pivot to a folded position overlaying the seat cushion. In addition, the seat 30 may be able to tumble forward to provide additional storage space or access behind the seat 16. Hence, the seat back and seat cushion may separately pivot to various storage positions as is known in the art. As appreciated, the seat may be of any suitable design, shape, size or configuration without deviating from the scope of the subject disclosure.

Figure 4:
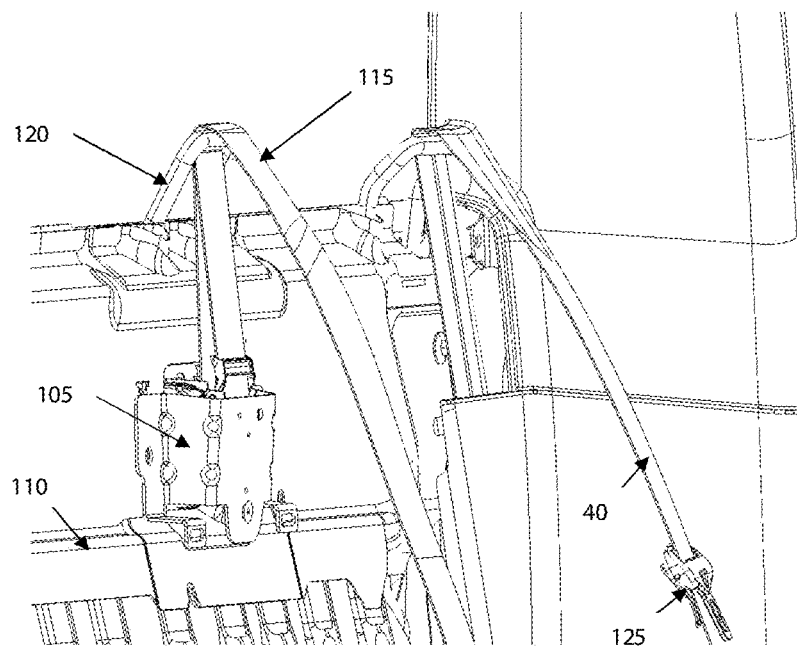
FIG. 4 is a perspective view of the seat belt assembly with the seats removed.

Referring to FIG. 2, in this embodiment, explanation is given of a wider seat back of a rear seat 30 for three people. A seat belt assembly is provided for each seat 30. Each seat belt assembly includes a retractor 105 as shown in FIG. 4 mounted on the seat back frame 110 (FIG. 4) behind the seat back 35 and a seat belt 40 is provided for each seat 30, and this seat belt 40 is configured so as to be capable of being pulled upward through a seat belt guide 120 provided adjacent to the upper part of the seat back frame 110. The tongue plate 125 is a male locking tab which selectively connects with a female buckle or latch 130, to form a three-point belt configuration. The tongue plate 125 and buckle 130 secure the shoulder belt to the seat 30, such that the belt 40 may restrain an occupant to the seat 30. The belt webbing 115 may be of a known webbing construction which has a high strength to weight ratio.

For the sake of illustration, in some figures, the seat belt assembly of the subject disclosure is illustrated using one of the seats having a seat belt 40 which is used to restrain a seated occupant to the seat 30.

Figure 3:
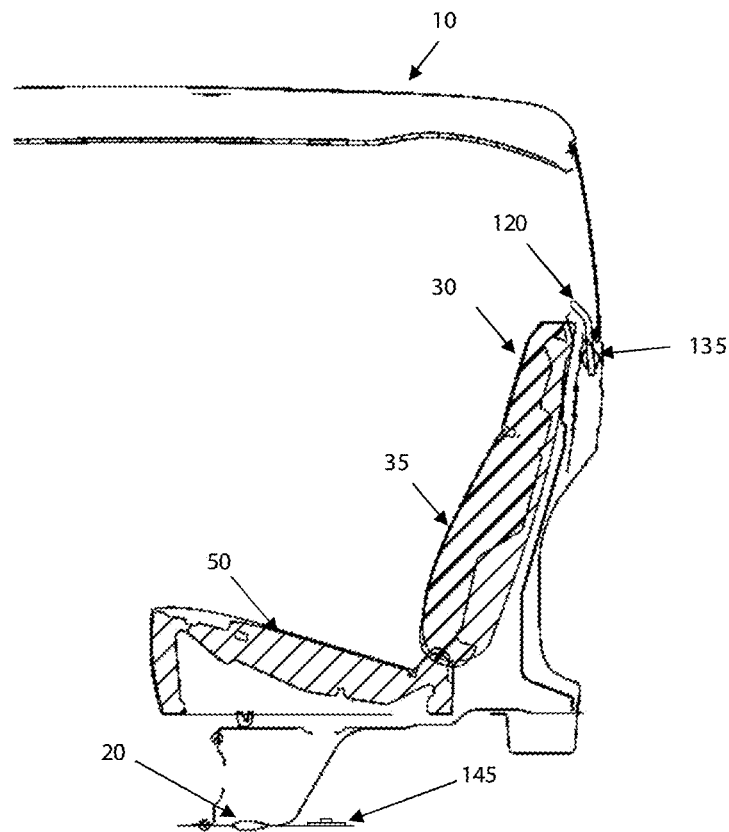
FIG. 3 is a cross-sectional side view of a seat taken through an elevated line showing the seat back and belt guide.
Figure 6:
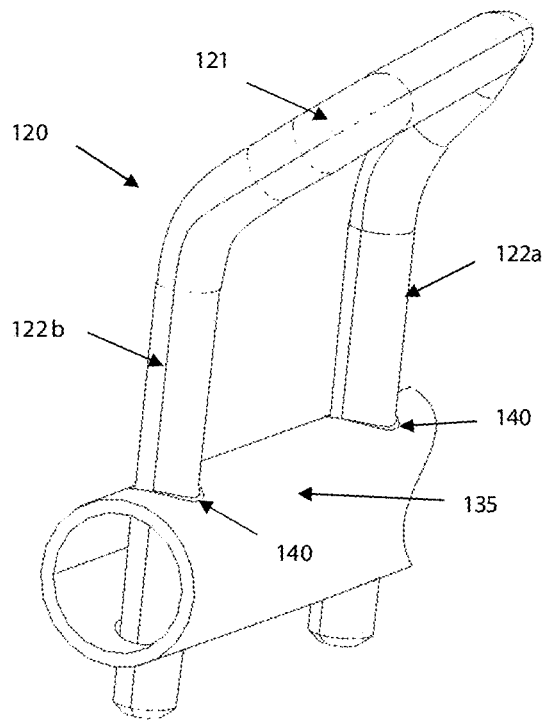
FIG. 6 is a perspective view of a seat belt guide of a seat belt guiding construction, according to one embodiment.

Referring to FIG. 3, a cross-sectional side view of a seat 30 is illustrated having the seat back 35, seat cushion 50 and belt guide 120. The seat back 35 is positioned adjacent to the rear wall 25 and the retractor 105 is fixed to the upper portion of the seat back frame 110. The tubular member 135 is positioned behind the seat back 35 and has holes 140 as seen in FIG. 6 through which the belt guides 120 are inserted and rigidly fixed using at least one of a welding, brazing, adhesive bonding, riveting, soldering and compression fitting. The belt guides 120 are located above the upper portion of the seat back frame 110 laterally offset along the vehicle width direction from the center of the seat back 35. The upper transverse portion 121 of the belt guide is slightly bent forward compared to the side portions to receive the seat belt webbing 115 from the retractor 105. The seat belt webbing 115 goes around the transverse portion 121 of the belt guide 120 towards the anchor 145. The anchor 145 is preferably attached to a structural frame of the vehicle such as the floor 20 or a side wall 15.

Referring to FIG. 4, in the seat back 35, a seat back frame 110 is provided substantially over the whole of the seat back 35. The seat back frame 110 is fitted with a retractor 105 for winding the seat belt webbing 115, an upper portion of the seat back frame 110 is formed into a rectangular shape in cross section, and the like. The upper portion of the seat back frame 110 extends in the width direction of the seat back 35. The seat belt retractor 105 is positioned in the particular portion in the width direction of the seat back frame 110 below the position of the seat belt guide 120, as shown in FIG. 4. The seat belt retractor 105 is attached to the seat back 35 by bolts or similar fasteners. Alternatively, the retractor 105 may be mounted to a portion of the seat or any other suitable structural member. The seat belt retractor 105 may be of a conventional design, for example, and includes a seat belt wound thereabout. In particular, the seat belt 40 may be a shoulder belt which extends from the retractor 105 towards the belt guide 120.

Figure 5:
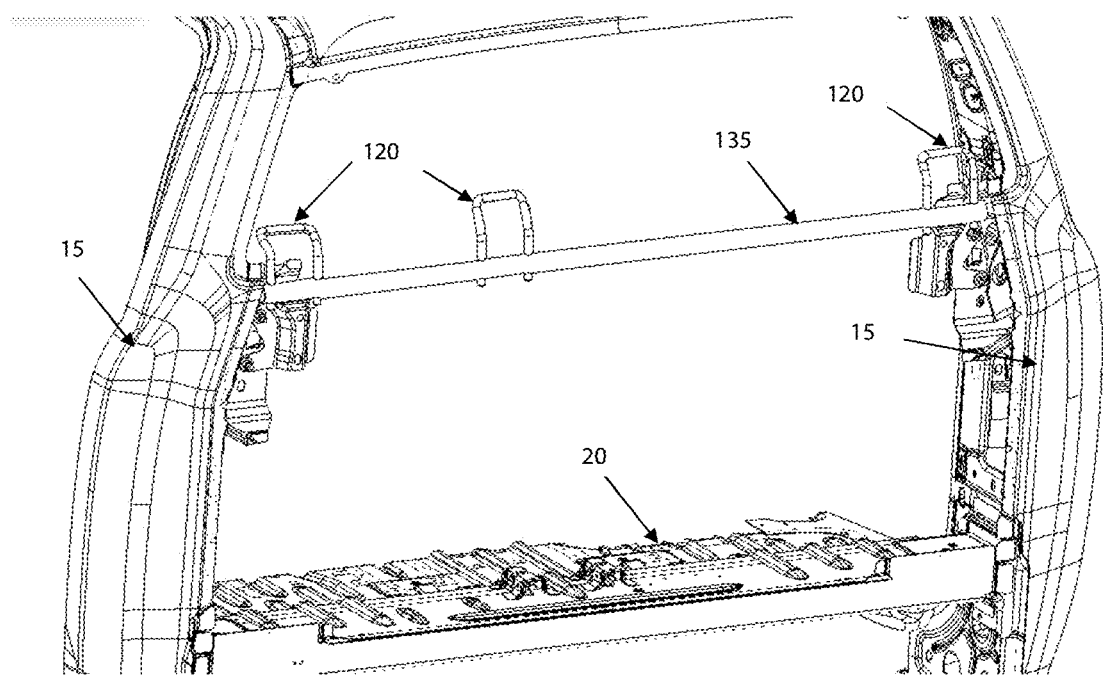
FIG. 5 is a perspective view with the seats and rear wall removed showing the tubular member attached to the vehicle side walls and the belt guide.

Referring to FIGS. 4 and 5, the tubular member 135 on the rear wall 25 is provided for transferring the pulling forces from the seat belt webbing 115 to the side walls 15 of the vehicle 2. Specifically, the belt guide 120 is loaded by the pulling forces from the seat belt 40 which is transferred to the tubular member 135 which in turn transfers the loads into the side walls 15 of the vehicle 2. During normal operating conditions, typically there are only minimal stresses imparted on belt guide 120 and tubular member 135 does not experience any significant bending forces. Accordingly, the tubular member 135 may not experience any transferred forces. Normal operating stresses on the tubular member 135 are created by pulling forces on the seat belt 40 typically from a seated occupant. For example, these forces may occur when the occupant is unwinding the shoulder belt and/or during normal use of the shoulder belt.

However, under certain vehicle deceleration conditions, such as in a sudden stop of the vehicle 2, the stresses imparted on the belt guide 120 can become significant. These stresses are created when a large pulling force is experienced by the seat belt 40 due to sudden movement of the occupant. More specifically, when the vehicle 2 experiences a deceleration exceeding a predetermined threshold, the retractor 105 locks the seat belt 40 in the given position. The pulling force of the seat belt 40 which holds the occupant in the seat is transferred to the tubular member 105 via the belt guide 120. The tubular member 105 in turn transfers these pulling loads to the side walls 15. Specifically, the pulling forces build up in the seat belt 40 and most of the forces or stresses from the seat belt 40 are transferred through the tubular member to the side walls of the vehicle 2 and to the anchor 145. Hence, the seat belt loads from the occupant can be efficiently transferred to the vehicle structural frame. The tubular member 135 may be hollow or solid, circular or any other cross section and may be made of any suitable material such as steel, aluminum alloy, titanium, metal alloys, metal ceramic, fiber composition, plastics or any combination of materials.

Referring to FIG. 6, the belt guide 120 is shown made up of two side portions 122a and 122b extending vertically, which are formed by rod-shaped members having a circular cross section, and a horizontal transverse portion 121 connecting the upper end portions of the two side end portions to each other. That is to say, the belt guide 120 is formed integrally by bending a rod-shaped member into a substantially U shaped staple and is disposed so that the opening of the U shape faces downward. The lower ends of the two side portions 122a and 122b are fixed to corresponding holes 140 in the tubular member 135 by welding, adhesive bonding, brazing, adhesive bonding, riveting, soldering, compression fitting or any other suitable connection. The horizontal transverse portion of the belt guide 121 is located above the top surface of the upper portion of the seat back frame 110 and is installed substantially in parallel with the top surface of the upper portion of the seat back frame. The outer peripheral surface of the horizontal transverse portion of the belt guide 121 forms a gentle circumferential surface so that the seat belt can slide on the periphery of the surface smoothly. The inside width i.e., distance between the opposed side portions of the belt guide 120 in the vehicle width direction, is approximately equal to or slightly larger than the width of the seat belt webbing 115. Also, the inside width of the belt guide 120 in the vehicle width direction is a width such that the seat belt webbing 115 can pass through, but a tongue plate of the seat belt cannot pass through. Under normal conditions when the belt webbing 115 is pulled over the belt guide 120, the length of the seat belt can be regulated. The horizontal transverse portion of the belt guide 120 is for guiding the flat surface of the seat belt webbing 115 and the side portions of the belt guide 120 are for guiding the sides of the seat belt webbing 115.

Figure 7:
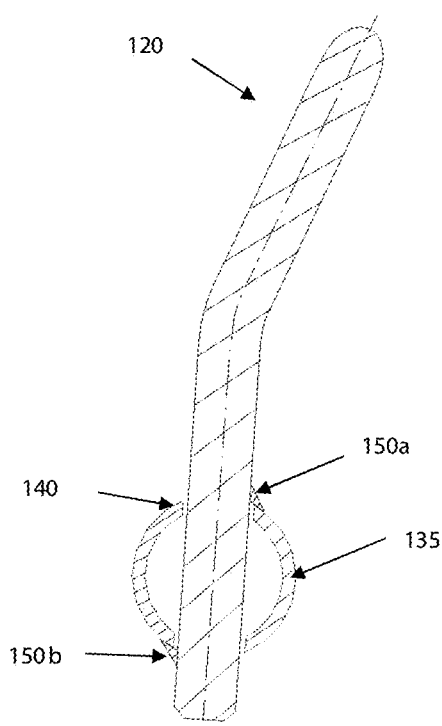
FIG. 7 is a cross-sectional view taken through an elevated line of the seat belt guide connected to the tubular member.

Referring to FIG. 7, the seat belt guide 120 is shown in cross section connected to the tubular member 135. In this embodiment, the cross section of the belt guide 120 rod member is circular but it can be of any other suitable geometric configuration according to other embodiments. In this embodiment, the cross section of the tubular member 135 is circular, but it can also be of any other suitable geometric configuration according to other embodiments. In this embodiment, the cross section of the tubular member 135 can be constant throughout the length of the tubular member but it can be variable along the length in other configurations. The side portions of the belt guide member 122a and 122b are inserted through the holes 140 in the tubular member 135 and are rigidly fixed using any suitable connection such as welding, bolting, adhesive bonding, riveting, soldering, compression fit. In this embodiment, the side portions 122a and 122b are welded to the tubular member 135 at two locations 150a and 150b to form a rigid connection.

The disclosure above encompasses multiple distinct aspects which may have independent utility. While each of these aspects has been disclosed in a particular form, the specific embodiments disclosed and illustrated above are not to be considered in a limiting sense as numerous variations are possible.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat belt assembly for a vehicle having a floor, spaced side walls extending from the floor, and a seat supported by the floor, the seat belt assembly comprising:
   a rear wall interconnecting the side walls;
   a seat belt retractor for attachment to a seat back frame;
   an anchor attached to the vehicle body; and
   a seat belt guide disposed adjacent to an upper portion of the seat back frame for guiding a seat belt webbing extending from the seat belt retractor to the anchor, wherein the seat belt guide is rigidly fixed to a tubular member extending along the length of rear wall and the tubular member is rigidly attached to the side walls at its ends, wherein the tubular member has mounting holes configured to receive the-two side portions of the seat belt guide, and wherein two side portions of the seat belt guide are inserted into the mounting holes in the tubular member with the side end portions facing downward and rigidly attached to the tubular member by at least one of a welding, brazing, adhesive bonding, riveting, soldering and compression fitting, wherein the seat belt guide is a rod-shaped member formed substantially into a U-shape defined by the two side portions and a transverse portion therebetween, wherein the transverse portion comprises belt guide portion, wherein the two side portions are rigidly fixed to the tubular member, and wherein the seat belt guide includes a roller rotatably supported by said rod shaped member with the seat belt webbing being movably supported by the roller.

2. The seat belt assembly of claim 1 further comprising a seat back frame, wherein the seat belt retractor is disposed in the seat back frame.

3. The seat belt assembly of claim 2, wherein the tubular member is at least one of a hollow tube or a solid tube.

4. The seat belt assembly of claim 3, wherein the transverse portion of the U- shaped belt guide has substantially the same width as the seat belt webbing.

5. The seat belt assembly of claim 4, wherein the upper transverse portion of the seat belt guide is bent forward towards the seat back compared to the lower side portions.

6. The seat belt assembly of claim 1, wherein an inside width of the seat belt guide in a vehicle width direction is larger than the width of the seat belt webbing.

7. A seat belt assembly for a vehicle having a floor, spaced side walls extending from the floor, a seat supported by the floor, and a seat back frame, the seat belt assembly comprising:
   a rear wall interconnecting the side walls;
   a seat belt retractor for attachment to the seat back frame;
   an anchor attached to the vehicle body; and
   a seat belt guide disposed adjacent to an upper portion of the seat back frame for guiding
   a seat belt webbing extending from the seat belt retractor to the anchor, wherein the seat belt guide is rigidly fixed to a tubular member extending along the length of rear wall and the tubular member is rigidly attached to the side walls at its ends, wherein the tubular member has mounting holes configured to receive the-two side portions of the seat belt guide, wherein the two side portions of the seat belt guide are inserted into the mounting holes in the tubular member with the side end portions facing downward and rigidly attached to the tubular member by at least one of a welding, brazing, adhesive bonding, riveting, soldering and compression fitting; and
   wherein the seat belt retractor is disposed in the seat back frame, and wherein the seat belt guide is a rod-shaped member formed substantially into a U-shape defined by two side portions and a transverse portion therebetween, wherein the transverse portion comprises the belt guide portion, and wherein the two side portions are rigidly fixed to the tubular member, and wherein said seat belt guide includes a roller rotatably supported by said rod shaped member with the seat belt webbing being movably supported by the roller.

8. The seat belt assembly of claim 7, wherein the upper transverse portion of the seat belt guide is bent forward towards the seat back compared to the lower side portions.

9. A vehicle comprising:
   a floor;
   spaced side walls extending from the floor;
   a seat supported by the floor;
   a rear wall interconnecting the side walls;
   a seat belt retractor for attachment to a seat back frame;
   an anchor attached to the vehicle body; and
   a seat belt guide disposed adjacent to an upper portion of the seat back frame for guiding a seat belt webbing extending from the seat belt retractor to the anchor, wherein the seat belt guide is rigidly fixed to a tubular member extending along the length of rear wall and the tubular member is rigidly attached to the side walls at its ends, wherein the tubular member has mounting holes configured to receiveth.e-two side portions of the seat belt guide, and wherein the two side portions of the seat belt guide are inserted into the mounting holes in the tubular member with the side end portions facing downward and rigidly attached to the tubular member by at least one of a welding, brazing, adhesive bonding, riveting, soldering and compression fitting, wherein the seat belt guide is a rod-shaped member formed substantially into a U-shape defined by the two side portions and a transverse portion therebetween, wherein the transverse portion comprises belt guide portion, wherein the two side portions are rigidly fixed to the tubular member, and wherein the seat belt guide includes a roller rotatably supported by said rod shaped member with the seat belt webbing being movably supported by the roller.

10. The vehicle of claim 9, wherein the seat assembly further comprises a seat back frame, wherein the seat belt retractor is disposed in the seat back frame.

11. The vehicle of claim 10, wherein the tubular member is at least one of a hollow tube or a solid tube.

12. The vehicle of claim 11, wherein the transverse portion of the U-shaped belt guide has substantially the same width as the seat belt webbing.

13. The vehicle of claim 11, wherein the transverse portion of the seat belt guide is bent forward towards the seat back compared to the lower side portions.

14. The vehicle of claim 9, wherein an inside width of the seat belt guide in a vehicle width direction is larger than the width of the seat belt webbing.

\* \* \* \* \*

UNITED STATES PATENT AND TRADEMARK OFFICE
CERTIFICATE OF CORRECTION

PATENT NO. : 11,548,472 B2
APPLICATION NO. : 17/712203
DATED : January 10, 2023
INVENTOR(S) : Tchepikov et al.

It is certified that error appears in the above-identified patent and that said Letters Patent is hereby corrected as shown below:

In the Claims

Column 7:
Claim 1, Line 44;
Delete "the-".

Column 8:
Claim 7, Line 21;
Delete "the-".
Claim 9, Line 57;
"receiveth.e-two" should be --receive two--.
Claim 9, Line 66;
After "comprises" insert --the--.

Signed and Sealed this
Second Day of April, 2024

Katherine Kelly Vidal
*Director of the United States Patent and Trademark Office*